United States Patent Office 3,173,908
Patented Mar. 16, 1965

3,173,908
METHOD OF FRACTIONATING POLYSACCHARIDE MIXTURES
Seymour H. Mann, Northridge, Michael R. Rusch, Simi, and Robert E. Williams, Sherman Oaks, Calif., assignors, by mesne assignments, to Rexall Drug and Chemical Company, Los Angeles, Calif., a corporation of Delaware
No Drawing. Filed Dec. 17, 1962, Ser. No. 244,866
4 Claims. (Cl. 260—209)

This invention relates to a new and improved method of fractionating polysaccharide mixtures.

Commercially available polysaccharide fractions, such as corn starch dextrin and corn syrup solids, are comprised of a heterogeneous mixture of glucose and polyglucose molecules having a wide range of number of glucose units per molecule, such number being commonly referred to as "degree of polymerization" or DP. The term "average DP" refers to the average number of glucose units per molecule in any particular heterogeneous fraction of polysaccharides. Commercially available polysaccharide fractions have an average DP of about 2 to 4, but these fractions contain molecules ranging from a DP of 1 (glucose) to a DP of 25 or higher.

The molecules having lower DP values and particularly glucose are useful as sweetening agents in the manufacture of candy and other nutritive products whereas higher DP molecules, and particularly those fractions having an average DP of 5 to 15, are useful as starting materials for the manufacture of antilipemic agents of the type described in U.S. Patent 3,017,407.

There has long been a need for an efficient method of fractionating heterogeneous polysaccharide fractions to yield fractions of lower and higher DP and it is a primary object of this invention to provide such a method.

Other objects and the advantages of the invention will become apparent from the following detailed description.

It has now been found that the aforementioned object is fulfilled by a process comprising passing an aqueous solution of a heterogeneous mixture of polysaccharides having varying degrees of polymerization counter-current to a water-miscible organic solvent in a liquid-liquid contacting zone and withdrawing from upper and lower portions of said zone solutions of polysacchardies having lower and higher degrees of polymerization, respectively.

The manner and process of carrying out this invention will now be described to enable a person skilled in the art of polysaccharide chemistry to practice the same as follows:

The heterogeneous polysaccharide mixtures which can be fractionated by the process according to this invention are readily obtainable from a variety of sources. Among such sources are amylaceous materials such as potato starch, corn starch, amylose and amylopectin. Especially suitable as fractionatable materials from these sources are corn starch dextrin and corn syrup solids which are heterogeneous mixtures of glucose (DP=1) and polysaccharides having DP values up to 25 or higher, the average DP of such materials generally being between about 2 and 4. The heterogeneous polysaccharide mixture to be fractionated in accordance with the invention is dissolved in water, preferably at a solids concentration of less than 30 percent by weight. A small amount of a preservative, such as an alcohol, may be present in the solution.

Water-miscible organic solvents which are used in the fractionation process of this invention include such organic solvents as cyclic ethers such as dioxane and tetrahydrofuran, ketones such as acetone, propanone, and the like and lower alkanols containing from 1 to 4 carbon atoms such as methanol, ethanol, n-propanol, isopropanol, t-butanol and the like. Mixtures of two or more water-miscible organic solvents are also satisfactory and the term "organic solvent" includes such mixtures of solvents as the full equivalent of any single water-miscible organic solvent in the invention.

Water miscible lower alkanols containing 1 to 4 carbon atoms are the preferred organic solvents for use in the invention, with isopropanol being particularly effective.

In accordance with the invention, an aqueous solution of the heterogeneous polysaccharide mixture is passed counter-current to the water-miscible organic solvent in a liquid-liquid contacting zone. The contacting zone is preferably a vertical cylindrical column of the type commonly used in the art of liquid-liquid extraction equipped with conventional means to facilitate turbulence within the zone, such as bubble plates, grids, and packing materials including balls, Raschig rings, cylinders, saddles and the like.

It has been found that the weight ratio of the water-miscible organic solvent to water within the zone should be between about 1 to 1 and about 6 to 1. With the particularly effective isopropanol as the solvent, optimum results are obtained at a weight ratio of isopropanol to water of 1.5 to 1 to 2.5 to 1.

The above described ratios can be effected by introducing the requisite amount of water with the heterogeneous polysaccharide mixture to be fractionated and utilizing an anhydrous solvent. Alternately, an aqueous solvent solution can be used to supply a portion of the water required in the fractionation. Where a solvent such as isopropanol is used which forms an azeotrope with water, an azeotropic mixture of water and the solvent is most desirably used since such an azeotropic mixture can be recovered by distillation of the fractions obtained from the zone and may be then returned to the zone as recycled solvent as described hereinafter.

In carrying out the method of the invention, the aqueous solution of the heterogeneous polysaccharide mixture to be fractionated is introduced into the upper portion of the contacting zone. The water-miscible organic solvent is introduced into the lower portion of the contacting zone. Fractionation occurs in such a way that the higher DP moieties of the heterogeneous mixture tend to fall to the bottom of the zone, from which a solution thereof is withdrawn either continuously or intermittently from the zone from a point below the location of the solvent feed. The lower DP moieties rise and a solution thereof is withdrawn from the upper part of the zone at a point above the point of entry of the aqueous solution of the heterogeneous polysaccharide mixture to be fractionated.

The zone is maintained at a temperature between 0° C. and about 75° C., it being desirable that a substantially constant temperature within the foregoing range be maintained.

The solutions of the lower and higher average DP fractions are distilled to separate organic solvent therefrom, which is then returned to the column as recycle solvent. In this way, the process is carried out continuously with a minimum solvent make-up requirement. Where the water-miscible organic solvent forms an azeotrope with water, the composition recovered in the distillation and returned as recycle solvent is the azeotrope.

The best mode contemplated by the inventors of carrying out this invention will now be set forth as follows:

*Example*

The liquid-liquid contacting zone used in the fractionation is a stainless steel cylinder 7 ft. long and 5½ inches in diameter. A screen used as a packing support is located one foot above the bottom of the column. Supported on the screen to a depth of five feet is a packing material consisting of small stainless steel cylinders 2 inches long and ¾ inch in diameter.

The column is initially filled with a mixture of isopropyl alcohol and water having a water content of 12.3% by weight.

Corn syrup having a water content of 20% by weight and an average DP of 2.5 glucose units per molecule is dissolved in water in the proportions of 1 kilogram of corn syrup to 4.22 liters of water. Approximately 4% (by volume) of isopropyl alcohol is added as a preservative to prevent bacterial decomposition. This final solution which is the aqueous solution of heterogeneous polysaccharide mixture to be fractionated has a concentration of 15% corn syrup solids by weight.

The corn syrup solids solution as described above is run into the column through an upper inlet above the packing at the rate of 3 liters per day initially, corresponding to 510 gram of dry corn syrup solids. An aqueous isopropyl alcohol solution (12.3% by weight of water) is introduced through a spray inlet below the screen at an initial rate of flow of 9 liters per day. The respective flow rates are gradually increased with analysis being regularly taken on the product streams removed from the top and bottom. Satisfactory fractionation occurs at a flow rate of 7 liters/day of the corn syrup solids solution and 21 liters/day of the isopropyl alcohol/water, corresponding to a weight ratio of isopropyl alcohol to water in the column of 1.78 to 1. The column is maintained at a temperature of 25° C. to 30° C. during the fractionation.

Under these conditions, the higher DP fraction withdrawn from the bottom of the column contains 27% of the corn syrup solids starting material and has an average DP of about 6.5 glucose units per molecule. The liquid phase dissolving the higher DP fraction is primarily water with a small amount of isopropanol which is removed by distillation.

The solution of the lower DP material is collected from the top of the column and is distilled. The distillate is an isopropyl alcohol/water azeotrope (12.3% water by weight) which is introduced into the bottom of the column as recycle solvent. The residue from the distillation is an aqueous syrup containing polysaccharide material with an average DP of about 1.25 representing 73% of the original starting material. The low average DP of this fraction indicates that it is predominately glucose (DP=1).

The method of the invention is characterized by the production of fractions each of which is tailor-made for a specific use. The lower DP material, being predominantly glucose, is ideally suited for nutritional uses as in the production of candy. The higher DP fraction is an excellent starting material for the preparation of therapeutic products as described in U.S. Patent 3,017,407.

The subject matter which the inventors regard as their invention is particularly pointed out and distinctly claimed as follows:

1. A method of separating a heterogeneous mixture of polysaccharides into fractions having lower and higher average degrees of polymerization which comprises introducing into the upper portion of a liquid-liquid contacting zone an aqueous solution containing not more than 30% by weight of said heterogeneous mixture, introducing into a lower portion of said zone a water-miscible organic solvent, the ratio by weight of said organic solvent to water in said zone being between about 1 to 1 and about 6 to 1, withdrawing from the upper portion of said zone at a location above the point of introduction of the aqueous solution of said heterogeneous mixture a solution of polysaccharides having a lower average degree of polymerization, and withdrawing from a location below the point of introduction of said organic solvent a solution of polysaccharides having a higher average degree of polymerization, the temperature within said zone being maintained at a substantially constant value within the range of 0° C. to 75° C.

2. A method according to claim 1 wherein said heterogeneous mixture is selected from the group consisting of corn syrup solids and corn starch dextrin and said organic solvent is a lower alkanol containing 1 to 4 carbon atoms.

3. A method of separating corn syrup solids into fractions having lower and higher average degrees of polymerization which comprises introducing into the upper portion of a liquid-liquid contacting zone an aqueous solution containing not more than 30% by weight of said corn syrup solids, introducing isopropanol into a lower portion of said zone, the ratio by weight of said isopropanol to water in said zone being between 1.5 to 1 and 2.5 to 1, withdrawing from the upper portion of said zone at a location above the point of introduction of the aqueous solution a solution of corn syrup solids having a lower average degree of polymerization, and withdrawing from a location below the point of introduction of said organic solvent a solution of corn syrup solids having a higher average degree of polymerization, the temperature within said zone being maintained at a substantially constant value within the range of 25° C. to 30° C.

4. A method of separating corn syrup solids into fractions having lower and higher average degrees of polymerization which comprises introducing into the upper portion of a liquid-liquid contacting zone an aqueous solution containing not more than 30% by weight of said corn syrup solids, introducing an aqueous solution of isopropanol at the azeotropic composition into a lower portion of said zone, the ratio by weight of isopropanol to water in said zone being about 1.78 to 1, withdrawing from the upper portion of said zone at a location above the point of introduction of said aqueous solution of corn syrup solids a solution of corn syrup solids having a lower average degree of polymerization and comprising predominantly glucose, and withdrawing from a location below the point of introduction of said aqueous solution of isopropanol a solution of corn syrup solids having a higher average degree of polymerization, the temperature within said zone being maintained at a substantially constant value within the range of 25° C. to 30° C.

References Cited by the Examiner

UNITED STATES PATENTS

| | | | |
|---|---|---|---|
| 1,297,171 | 3/19 | Halley et al. | 23—270.5 |
| 2,214,206 | 9/40 | Rasor | 209—158 XR |
| 2,400,962 | 5/46 | Thompson | 23—267 XR |
| 2,976,274 | 1/61 | McNeely et al. | 260—209 |
| 3,094,517 | 6/63 | Stanley | 260—209 |

FOREIGN PATENTS 827,494  2/60  Great Britain.

LEWIS GOTTS, *Primary Examiner.*

CHARLES B. PARKER, *Examiner.*